United States Patent
Tope

(10) Patent No.: US 9,286,723 B2
(45) Date of Patent: Mar. 15, 2016

(54) METHOD AND SYSTEM OF DISCRETIZING THREE-DIMENSIONAL SPACE AND OBJECTS FOR TWO-DIMENSIONAL REPRESENTATION OF SPACE AND OBJECTS

(71) Applicant: Parag Tope, Pleasanton, CA (US)

(72) Inventor: Parag Tope, Pleasanton, CA (US)

( * ) Notice: Subject to any disclaimer, the term of this patent is extended or adjusted under 35 U.S.C. 154(b) by 207 days.

(21) Appl. No.: 13/857,127

(22) Filed: Apr. 4, 2013

(65) Prior Publication Data

US 2014/0300699 A1    Oct. 9, 2014

Related U.S. Application Data

(60) Provisional application No. 61/620,297, filed on Apr. 4, 2012, provisional application No. 61/808,607, filed on Apr. 4, 2013.

(51) Int. Cl.
*H04N 7/50* (2006.01)
*H04N 7/30* (2006.01)
*G06T 15/00* (2011.01)
*G06T 19/00* (2011.01)

(52) U.S. Cl.
CPC ........... *G06T 19/006* (2013.01); *G06T 2210/04* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 5,754,680 A * | 5/1998 | Sato | ......................... | G06T 17/20 345/423 |
| 6,268,862 B1 * | 7/2001 | Uchiyama | ............... | G06T 15/10 345/419 |
| 8,031,223 B2 * | 10/2011 | Teo | ..................... | H04N 5/23238 348/36 |
| 8,542,911 B1 * | 9/2013 | Korobkin | ................ | G06T 17/10 345/419 |
| 8,786,681 B1 * | 7/2014 | Conran | .............. | H04N 13/0264 345/418 |
| 8,897,541 B2 * | 11/2014 | Weisenburger | ........ | G01C 11/00 345/629 |
| 2005/0147257 A1* | 7/2005 | Melchior | ............. | H04N 5/2224 381/61 |
| 2005/0219239 A1* | 10/2005 | Mashitani | .......... | H04N 13/0003 345/419 |
| 2012/0094754 A1* | 4/2012 | Suzuki | .................... | A63F 13/10 463/30 |

* cited by examiner

Primary Examiner — Jamie Atala
Assistant Examiner — Patrick Demosky

(57) ABSTRACT

In one exemplary embodiment, a method includes obtaining a digital image of an object. A coordinate-space position of a digital camera is defined in relation to the digital object for the digital image. A coordinate-space region around the coordinate-space position is defined. The coordinate-space region is associated with the digital image based on the coordinate-space position defined for the digital image. A digital image of a room is obtained. A three-dimensional representation of the digital image of the room is created according to the coordinate system based on the positional information of another digital camera that obtained the digital image of the room. An object proxy is located in the three-dimensional representation of the digital image. A coordinate-space region of the room of the object proxy is mapped with a substantially matching coordinate-space region of the object. The digital image of the object associated with substantially matching coordinate-space region is overlaid onto the digital image of the room.

16 Claims, 7 Drawing Sheets

METHOD AND SYSTEM OF DISCRETIZING THREE-DIMENSIONAL SPACE AND OBJECTS FOR TWO-DIMENSIONAL REPRESENTATION OF SPACE AND OBJECTS

CROSS-REFERENCE TO RELATED APPLICATIONS

This application claims priority to U.S. patent provisional application No. 61/620,297 titled DISCRETIZING THREE DIMENSIONAL SPACE FOR TWO DIMENSIONAL REPRESENTATION OF SPACE AND OBJECTS filed on Apr. 4, 2012. This provisional application is hereby incorporated by reference in its entirety.

This application also claims priority to U.S. patent provisional application No. 61/808,607 titled METHOD AND SYSTEM OF DISCRETIZING THREE-DIMENSIONAL SPACE AND OBJECTS FOR TWO-DIMENSIONAL REPRESENTATION OF SPACE AND OBJECTS filed on Apr. 4, 2013. This provisional application is hereby incorporated by reference in its entirety.

BACKGROUND

1. Field

This application relates generally to digital images, and more specifically to discretizing three-dimensional space for two-dimensional representation of space and objects.

2. Related Art

A single object and/or a collection of objects can be represented within any three-dimensional space using several existing desktop computing tools. However, there is a growing need to showcase these objects or products within a three-dimensional space on websites. This type of three-dimensional modeling and representation is used in several applications from industrial to architectural. An example would be to showcase furniture or furnishings within a virtual view of a room displayed with a web browser.

BRIEF SUMMARY OF THE INVENTION

In one exemplary embodiment, a computer-implemented method includes the step of obtaining a digital image of an object. A coordinate-space position of a digital camera is defined, according to a coordinate system, in relation to the digital object for the digital image. A coordinate-space region around the coordinate-space position is defined. The coordinate-space region is associated with the digital image based on the coordinate-space position defined for the digital image. A digital image of a room is obtained. A three-dimensional representation of the digital image of the room is created according to the coordinate system based on the positional information of another digital camera that obtained the digital image of the room. An object proxy is located in the three-dimensional representation of the digital image. A coordinate-space region of the room of the object proxy is mapped with a substantially matching coordinate-space region of the object. The digital image of the object associated with substantially matching coordinate-space region is overlaid onto the digital image of the room.

Optionally, the coordinate-space position can be defined according to a cylindrical coordinate system. The digital image of the object can be a digital camera digital image or a computer-rendered digital image. The digital camera can be a physical digital camera or a virtual digital camera inside a virtual three-dimensional space.

BRIEF DESCRIPTION OF THE DRAWINGS

The present application can be best understood by reference to the following description taken in conjunction with the accompanying figures, in which like parts can be referred to by like numerals.

Figure 1:
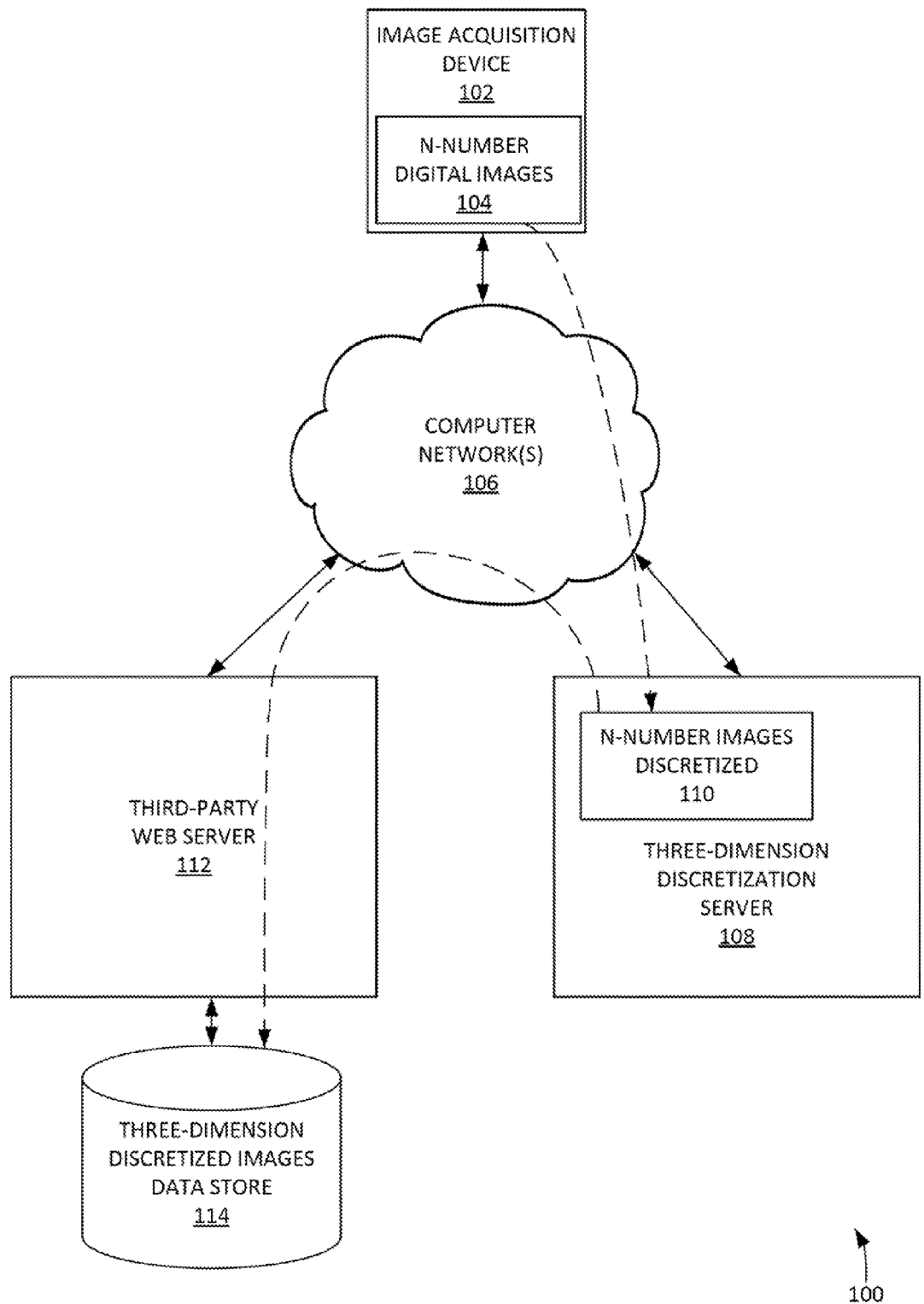
FIG. 1 depicts a block diagram for a system of discretizing three-dimensional space for two-dimensional representation of space and objects, according to some embodiments.

The Figures described above are a representative set, and are not an exhaustive with respect to embodying the invention.

DESCRIPTION

Disclosed are a system, method, and article of discretizing three-dimensional space and/or objects for two-dimensional representation of space and/or objects. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein can be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification can, but do not necessarily, all refer to the same embodiment.

Furthermore, the described features, structures, or characteristics of the invention can be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention can be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or cannot strictly adhere to the order of the corresponding steps shown.

Exemplary Environment and Architecture

FIG. 1 depicts a block diagram for a system 100 of discretizing three-dimensional space for two-dimensional representation of space and objects, according to some embodiments. In some embodiments, discretization can concern the process of transferring continuous models and equations into discrete counterparts. System 100 can include an image acquisition device 102 for obtaining digital images of an object. Image acquisition device 102 can include any system for the acquisition and communication of digital images, such as a digital camera and a computing device with Internet connectivity. In one example, image acquisition device 102 can obtain n-number of digital images 104 of an object. The spatial relationship of image acquisition device 102 with respect to the object for each digital image can be obtained as well. Example spatial relationships include the spatial relationship between image acquisition device 102 and the object in terms of various coordinate systems. For example, a cylindrical coordinate system can be used to map the image acquisition device 102 to the object for each image of the n-number of digital images 104. A cylindrical coordinate system can be a three-dimensional coordinate system that specifies point positions by the distance from a chosen reference axis (e.g. the reference point can be the position of the object), the direction from the axis relative to a chosen reference direction, and the distance from a chosen reference plane perpendicular to the axis. The latter distance can be given as a positive or negative number depending on which side of the reference plane faces the point. The origin of the system can be a reference point where all three coordinates can be given as zero (e.g. the position of the object). This can be the intersection between the reference plane and the axis. The three coordinates of the cylindrical coordinate system can be $\rho$, $\phi$, and z. In this way, any spatial relationship between and the object image acquisition device 102 for a particular digital image of the object can be defined in terms of $\rho$, $\phi$, and z. For example, a point 'P' (e.g. wherein point 'P' is the position of image acquisition device 102 with respect to the object treated as the origin of the cylindrical system) can be defined as: the radial distance '$\rho$' is the Euclidean distance from the z axis to the point 'P'; the azimuth '$\phi$' is the angle between the reference direction on the chosen plane and the line from the origin to the projection of 'P' on the plane; the height 'z' is the signed distance from the chosen plane to the point 'P'.

For example, image acquisition device 102 can obtain an image of the object at a point P1. The cylindrical coordinates for the spatial relationship between the image acquisition device 102 and the object can be obtained and associated with that digital image. The image acquisition device 102 can be moved a set distance (e.g. in terms of $\rho$, $\phi$, or z) and another digital image of the object obtained. The cylindrical coordinates for the spatial relationship between the image acquisition device 102 and the object can be obtained and associated with the second digital image. This process can be repeated n-number of times. The n-number of times can be sufficient to portray a three-dimensional view of the object according to a specified set of parameters. It is noted that two of the three values of the $\rho$, $\phi$, z set can be held constant while one value is sequentially altered for the image acquisition device 102 according to a set sequence of values. For example, $\rho$, $\phi$ can be held constant while the z value is modified for the position of the image acquisition device 102 for a specified sequence of digital image acquisitions. Then the $\phi$ can be modified the position of the image acquisition device 102 and another sequence of the z value modification for the position of the image acquisition device 102 for a specified sequence of digital image acquisitions can be repeated. In this way, n-number of digital images for the object for a specified range of values for $\rho$, $\phi$, and z can be obtained. It is noted that the image acquisition device 102 can be placed on a mechanical positioning device and the process of image acquisition can be automatically performed. Accordingly, the spatial relationship metadata can be obtained and associated with each respective member of the n-number of digital images 104 and can be communicated to three-dimension discretization server 108 (e.g. via computer network(s) 106 such as the Internet). It is noted, that in other example embodiments, other coordinate systems can be utilized (e.g. Cartesian coordinate system, spherical coordinate system (e.g. with radius 'r', elevation or inclination '$\theta$', azimuth '$\phi$'), etc.).

Three-dimension discretization server 108 can receive n-number digital images 104 and associated spatial relationship information from image acquisition device 102. These n-number digital images 104 can be discretized into n-number of discretized images 110 using the associated spatial relationship. For example, each image can be associated with a region of a coordinate space based on the associated spatial relationship information. The size of the region of coordinate space can be based on various parameters such an administrator input, size of object in digital images, etc.

Three-dimension discretization server 108 can also receive a digital image of a representation of a three-dimensional space (e.g. a digital image of a room) represented in a two-dimensional format (e.g. third-party web server 112). The digital image of a representation of a three-dimensional space can be discretized according to a specified coordinate system as well. For example, three-dimension discretization server 108 can receive spatial calibration information about the digital image of the representation of the three-dimensional space as well. Three-dimension discretization server 108 can then utilize the spatial calibration information and various attributes of the representation of the three-dimensional space (e.g. wall/floor boundaries, etc.) to map the representation of the three-dimensional space with the coordinate system of n-number of discretized images 110. Three-dimension discretization server 108 can further receive an indication from a user referring to a placement of the object depicted in n-number of discretized images 110 in the representation of the three-dimensional space. Three-dimension discretization server 108 can determine a region of the coordinate system that maps to the object's placement location in the representation of the three-dimensional space. Three-dimension discretization server 108 can search the n-number of discretized images 110 for a digital image with a spatial relationship of image acquisition device 102 with respect to the object with coordinates that are substantial similar to the region of the coordinate system that maps to the object's placement location in the representation of the three-dimensional space. Three-dimension discretization server 108 can then modify the digital image of the representation of the three-dimensional space to include the selected image of the object.

Three-dimension discretization server 108 can then modify the digital image of the representation of the three-dimensional space to include the selected image of the object. This modified image can be provided to third-party web server 112 for communication to a client's web browser. Additionally, tree-dimension discretization server 108 can receive various data about the camera position that was used to take the representation of a three-dimensional space such as the field of view/focal length, rotation, tilt, roll, etc. of the digital camera when the digital image was taken.

Third-party web server 112 be utilized by entities, such as real Estate agents, home stagers, home owners, interior designers and/or any other party interested and/or involved in real estate, homes, buildings, etc. interested in virtually staging/furnishing a home, building and/or a room etc. for a preview for a potential buyer and/or seller. Third-party web server 112 can utilize system 100 to provide an application that allows users to place objects into an empty home (or a room in the home) such as a couch, tables, beds, a television, a dresser etc. Such an application may be used by furniture and/or interior designers and/or home buyers, sellers as a way of previewing or looking at what a home would look like if and when it were fully furnished. In some embodiments, objects can be rendered in a software program (e.g. a digital drawing program) in a virtual three-dimensional space. A virtual camera can utilized in lieu of a physical camera and the virtual spatial relationship between the object and the virtual camera ascertained accordingly. System 100 can include a three-dimensional discretized image data store 114.

Figure 2:
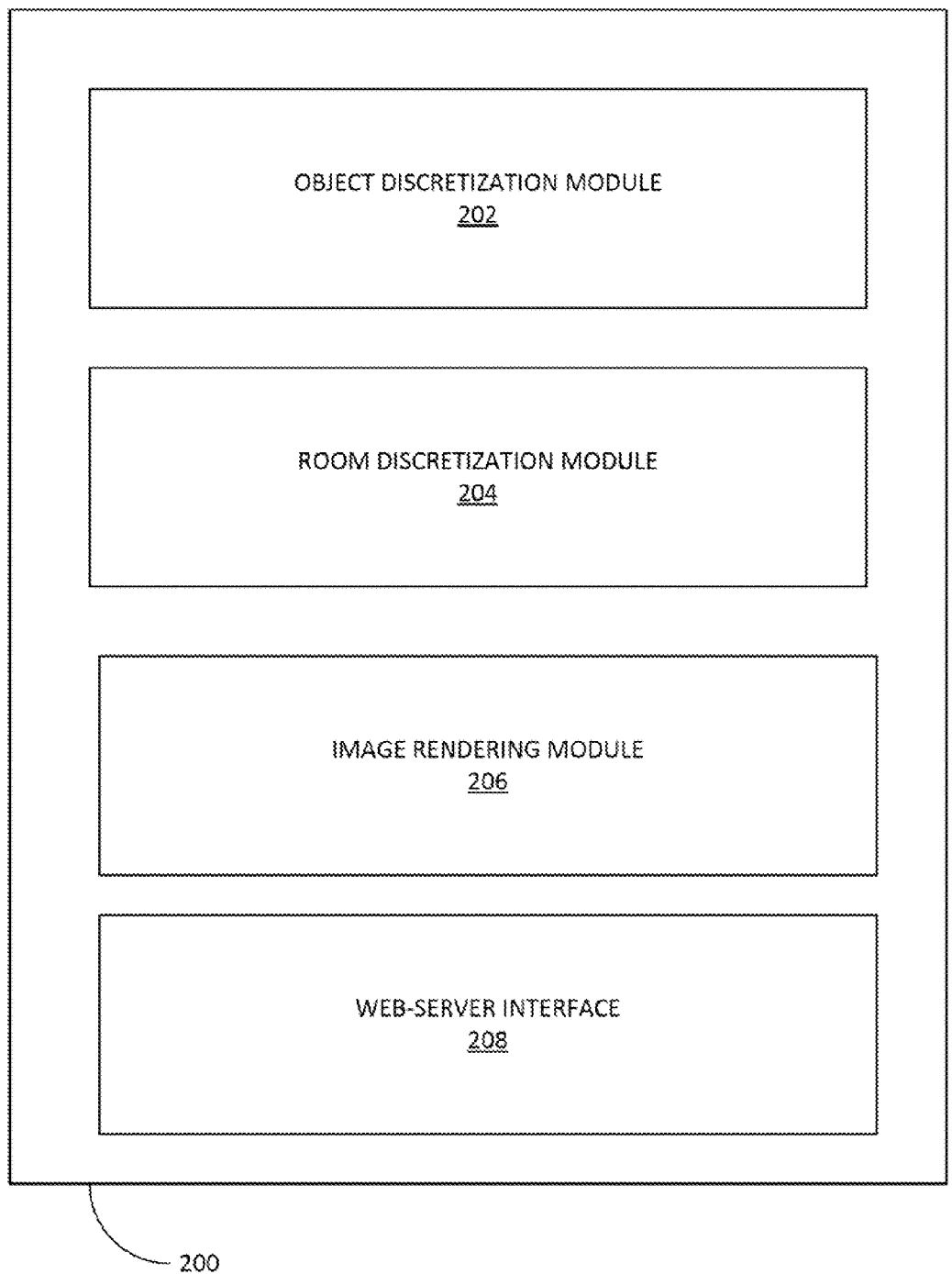
FIG. 2 illustrates a block diagram of an example three-dimension discretization server, according to some embodiments.

FIG. 2 illustrates a block diagram of an example three-dimension discretization server 200, according to some embodiments. Three-dimension discretization server 200 can include an object discretization module 202. Object discretization module 202 can discretize objects according to the various methods described herein. For example, Object discretization module 202 can obtain a digital image. Object discretization module 202 can define a coordinate-space position of the digital camera in relation to the object when the digital image. Various coordinate systems can be utilized. Additionally, various methodologies to determine spatial location/orientation of the digital camera can be utilized (e.g. accelerometers, gyroscopes, robotic arms with a known distance, etc.). A coordinate-space region can be associated with each coordinate-space position. The size of the coordinate-space region can set according to various factors such based on the n-number of digital images to be taken and the various angles and positions of the object to be depicted in the n-number of images. Additionally, the coordinate-space regions associated with a set of digital images of an object can vary in size (e.g. become smaller when the digital image is closer to the object, etc.). Three-dimension discretization server 200 can include one or more image analyzers and graphics-editing programs.

Three-dimension discretization server 200 can include a room discretization module 204. Room discretization module 204 can discretize a three-dimensional space represented by a two-dimensional digital image obtained by a digital camera. (It is noted that the room digital image can be obtained by another digital camera than that used to discretize an object). Various camera-positional information can be obtained relating to the position of the digital camera when the room digital image is obtained. Room discretization module 204 can discretize the two-dimensional digital image according to a coordinate system such as cylindrical-coordinate system. It is noted that various calibrating techniques such as those described herein can also be utilized in the discretization process. It is noted that, in some embodiments, other spaces can be discretized in addition to rooms (e.g. gardens, automobile interiors, etc.).

Three-dimension discretization server 200 can include an image rendering 206. Image rendering 206 can map the various digital images of an object with the appropriate three-dimensional spatial region of the room. Image rendering 206 can also overlay the digital image of the object onto the digital image of the room.

Three-dimension discretization server 200 can include a web-server interface 208. Web-server interface 208 can provide an interface for uploading various digital images as well as a web page that allows users to interact with various object digital images and/or room/space digital images. Web-server interface 208 can be configured to enable a user to locate an object proxy in the three-dimensional representation of the digital image of the room.

Figure 3:
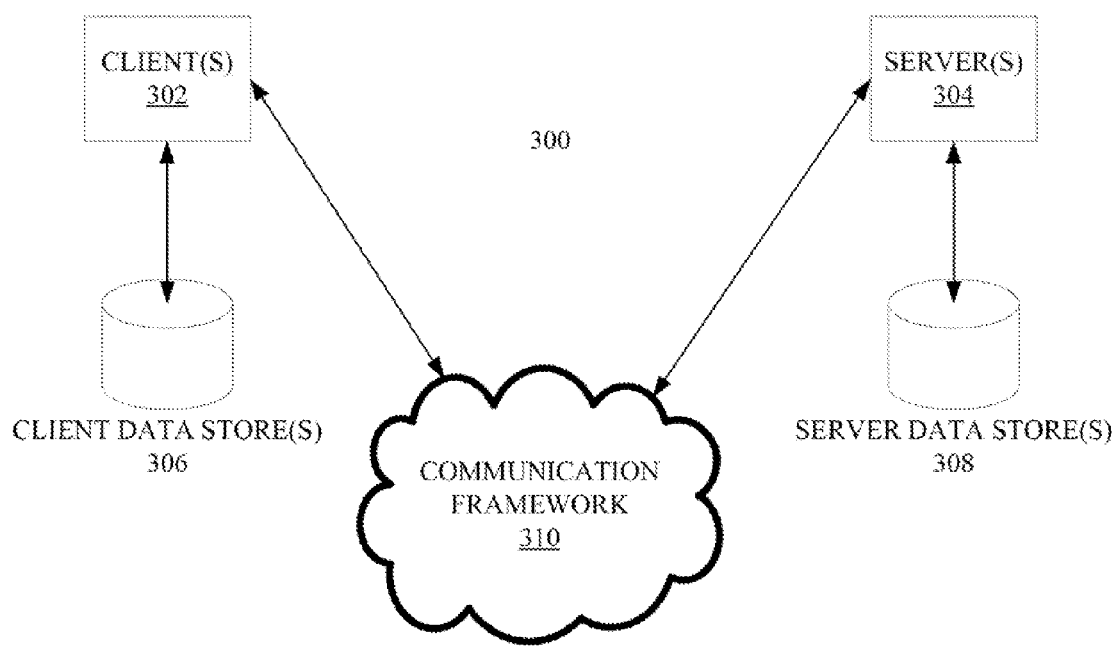
FIG. 3 is a block diagram of a sample computing environment that can be utilized to implement some embodiments.

FIG. 3 is a block diagram of a sample computing environment 300 that can be utilized to implement some embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 can be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304.

In some embodiments, system 300 can be include and/or be utilized by the various systems and/or methods described herein to implement process 100. User login verification can be performed by server 304. Client 302 can be in an application (such as a web browser, augmented reality application, text messaging application, email application, instant messaging application, etc.) operating on a computer such as a personal computer, laptop computer, mobile device (e.g. a smart phone) and/or a tablet computer. In some embodiments, computing environment 300 can be implemented with the server(s) 304 and/or data store(s) 308 implemented in a cloud computing environment.

Figure 4:
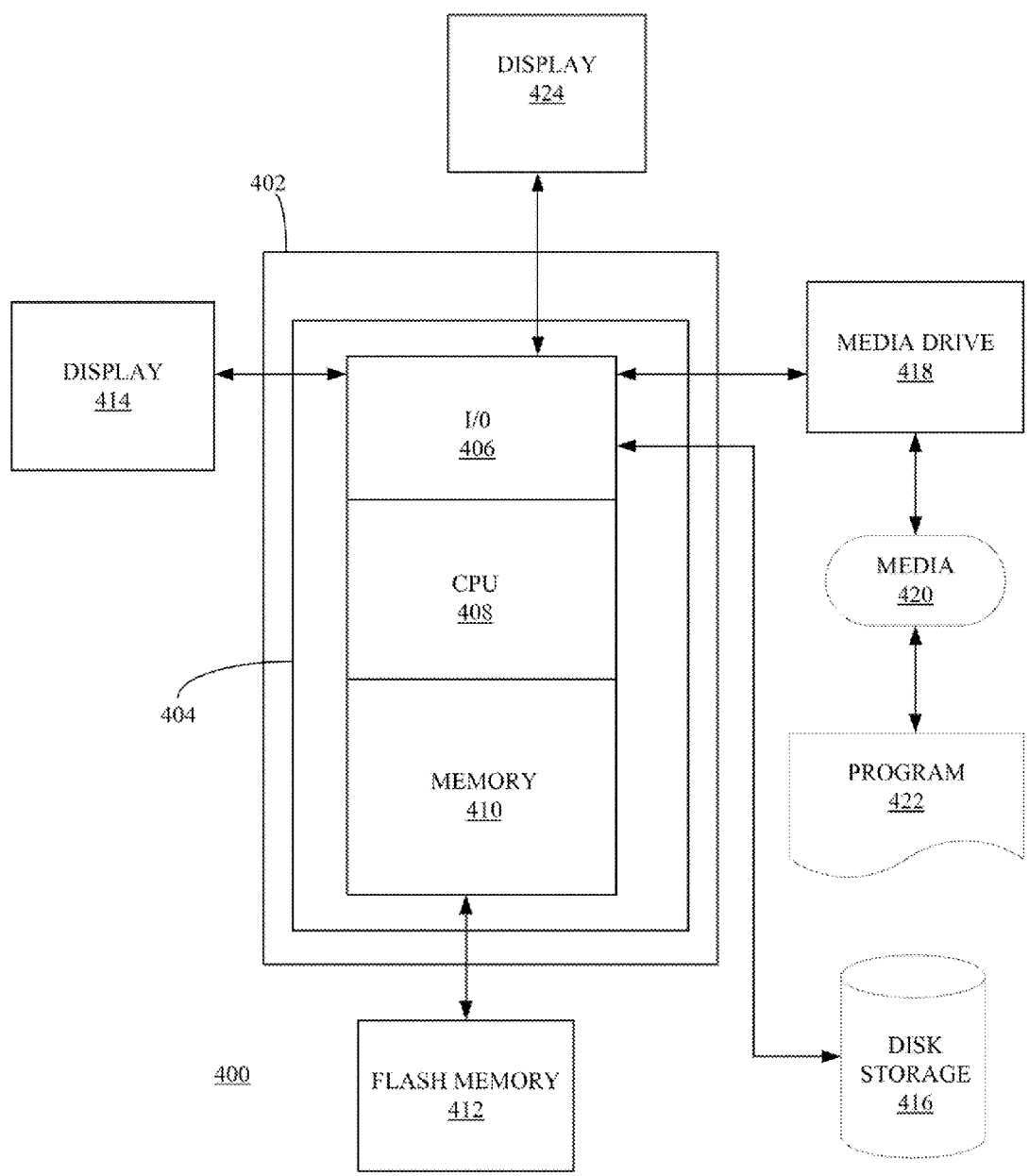
FIG. 4 depicts an exemplary computing system that can be configured to perform any one of the processes provided herein.

FIG. 4 depicts an exemplary computing system 400 that can be configured to perform any one of the processes provided herein. In this context, computing system 400 can include, for example, a processor, memory, storage, and I/O devices (e.g., monitor, keyboard, disk drive, Internet connection, etc.). However, computing system 400 can include circuitry or other specialized hardware for carrying out some or all aspects of the processes. In some operational settings, computing system 400 can be configured as a system that includes one or more units, each of which is configured to carry out some aspects of the processes either in software, hardware, or some combination thereof.

FIG. 4 depicts computing system 400 with a number of components that can be used to perform any of the processes described herein. The main system 402 includes a motherboard 404 having an I/O section 406, one or more central processing units (CPU) 408, and a memory section 410, which can have a flash memory card 412 related to it. The I/O section 406 can be connected to a display 414 and display

424, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. In another example, computing system 400 can be configured as a mobile device and include such systems as can be typically included in a mobile device such as GPS systems, gyroscope, accelerometers, cameras, augmented-reality systems, etc.

Exemplary Processes

Figure 5:
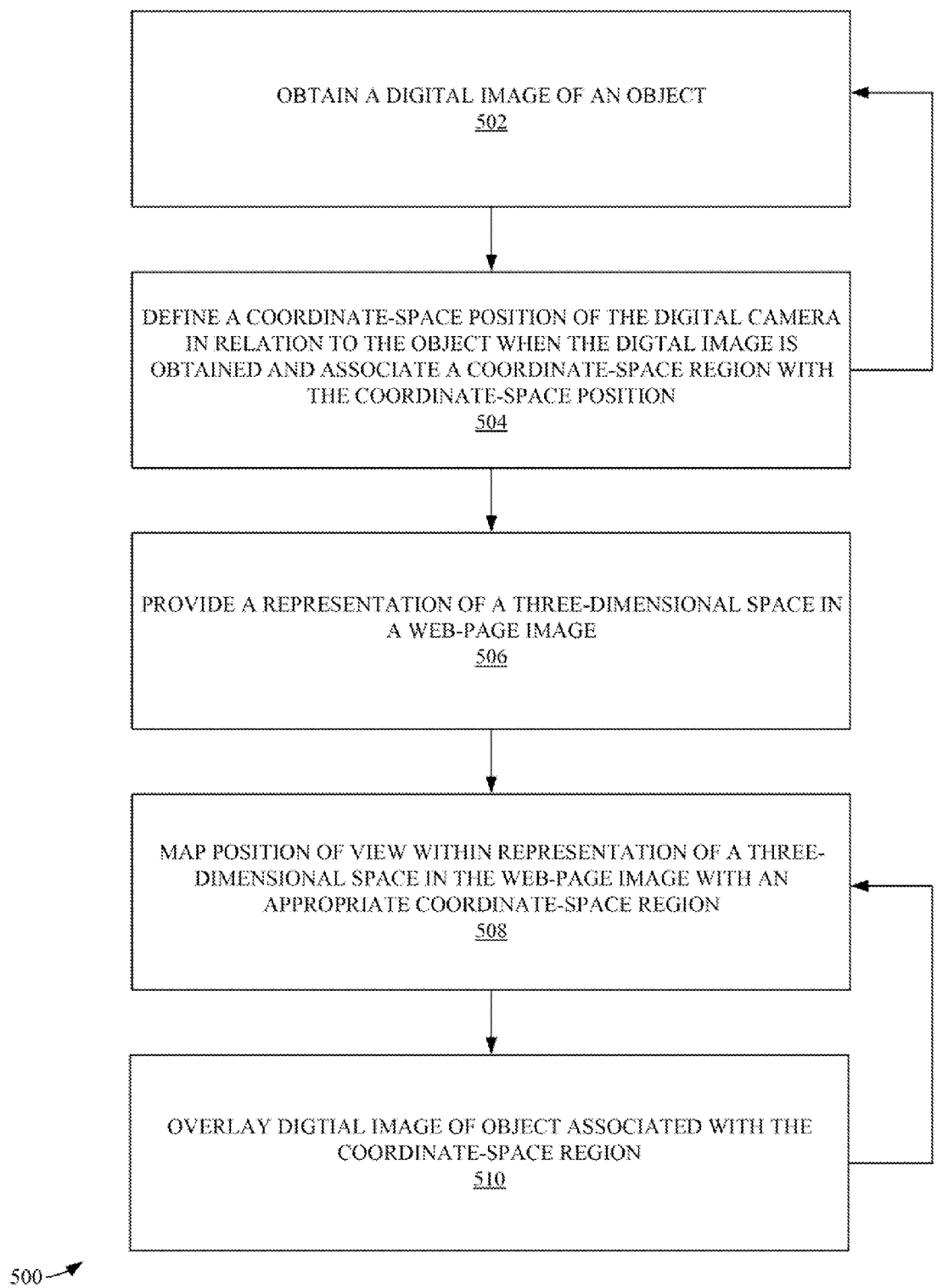
FIG. 5 depicts a process of discretizing three-dimensional space for two-dimensional representation of space and objects, according to some embodiments.

FIG. 5 depicts a process 500 of discretizing three-dimensional space for two-dimensional representation of space and objects, according to some embodiments. In step 502 of process 500, a digital image of an object is obtained. The digital image can be taken with a digital camera. In step 504, a coordinate-space position of the digital camera is defined in relation to the object when the digital image is obtained. Various coordinate systems can be utilized. Additionally, various methodologies to determine spatial location/orientation of the digital camera can be utilized (e.g. accelerometers, gyroscopes, robotic arms with a known distance, etc.). A coordinate-space region can be associated with each coordinate-space position. The size of the coordinate-space region can set according to various factors such based on the n-number of digital images to be taken and the various angles and positions of the object to be depicted in the n-number of images. Additionally, the coordinate-space regions associated with a set of digital images of an object can vary in size (e.g. become smaller when the digital image is closer to the object, etc.). It is noted that steps 502 and 504 can be repeated n-number of times.

In step 506, a three-dimensional representation of a space (e.g. a room in a building) can be provided in a web page image. The web-page image itself can be in two-dimensions. The web-page image can be discretized into spatial regions defined according to a three-dimensional (e.g. spatial) coordinate system as well. The three-dimensional coordinate system of the digital image(s) of the preceding steps can be the same as the coordinate system of the three-dimensional representation of the space. For example, a two-dimensional region of the web-page image can be associated with a set of three-dimensional spatial regions defined by the three-dimensional coordinate system of the n-number of discretized digital images produced in the previous steps of process 500. Also, various fields of view/focal lengths, rotations, tilts, rolls, sizes, etc. available for display of an object in the two-dimensional region of the web-page image can associated with the one or more three-dimensional spatial regions. Thus, each available value of the various fields of view/focal lengths, rotations, tilts, rolls, sizes, etc. can be associated with a particular three-dimensional spatial region within the set of three-dimensional spatial regions associated with the particular two-dimensional region of the web-page view.

Various cues and/or methods can be utilized to calibrate the three-dimensional representation of a space to the three-dimensional coordinate system as well. For example, various calibration methods to discretize the space of the scene depicted in the three-dimensional representation of a space in terms of the coordinate system of the digital images (e.g. identification of calibration objects in the scene of the three-dimensional representation of a space, virtual calibration objects inserted into the digital image of the three-dimensional representation of a space, etc.). In one example, the three-dimensional representation of a space can be an image of a room. Accordingly, the coordinate space of room can be calculated based on camera position that was used to take the digital image of the field of view/focal length, rotation, tilt, roll, etc. In this way, in step 508, the web-page image view is mapped within the three-dimensional representation of the space with an appropriate coordinate-space region. The web-page image view can be determined based on where a user drags and drops a representation of the object with the web-page image. The web-page image view can be further determined based on the orientation of the representation of the object within the web-page image. In 510, the digital image of the object associated with the coordinate space region is obtained and overlaid over the web-page image. It is noted that steps 508-510 can be repeated j-number of times.

Figure 6A:
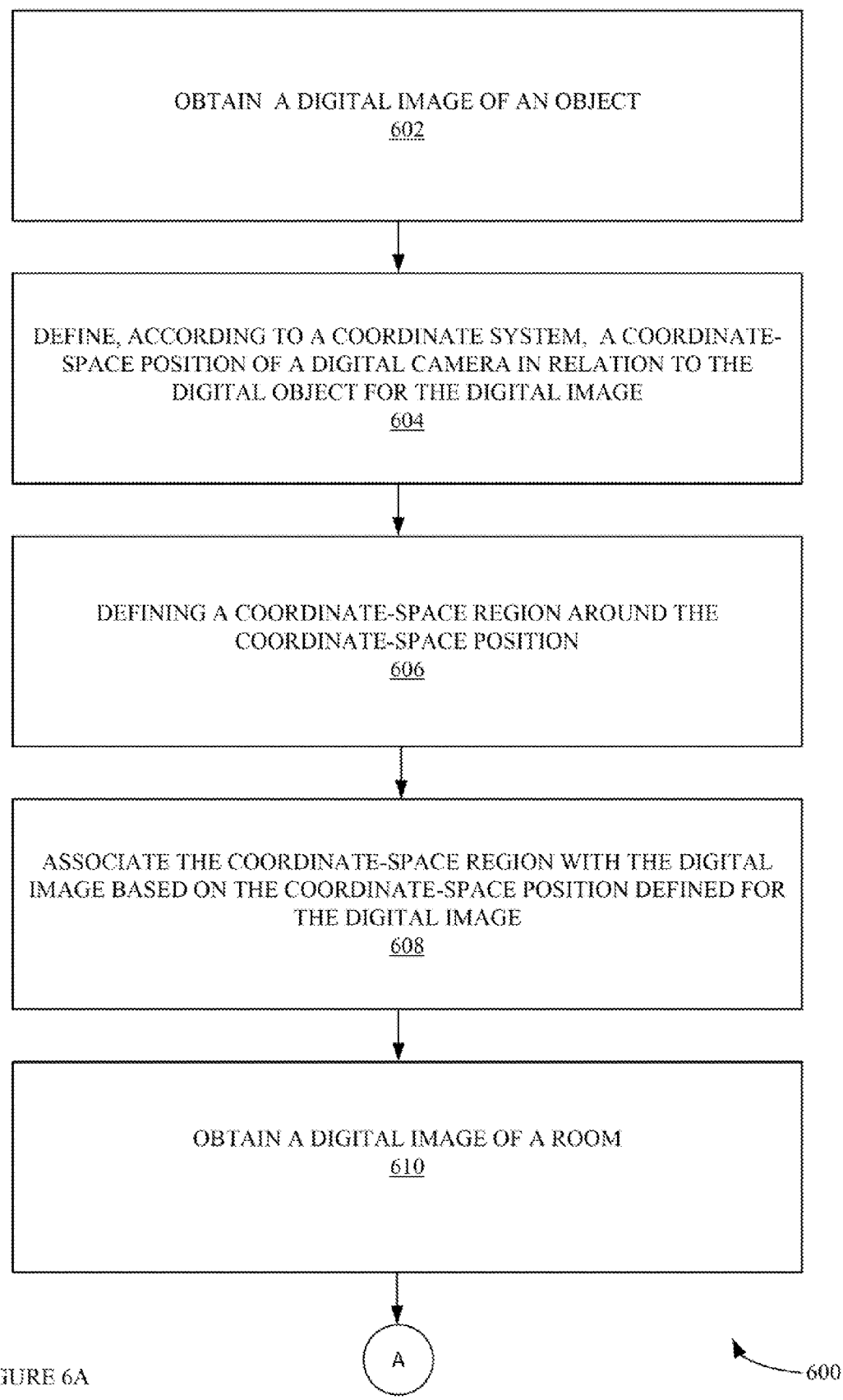
FIGS. 6 A-B illustrate an example discretization process 600, according some embodiments.
Figure 6B:
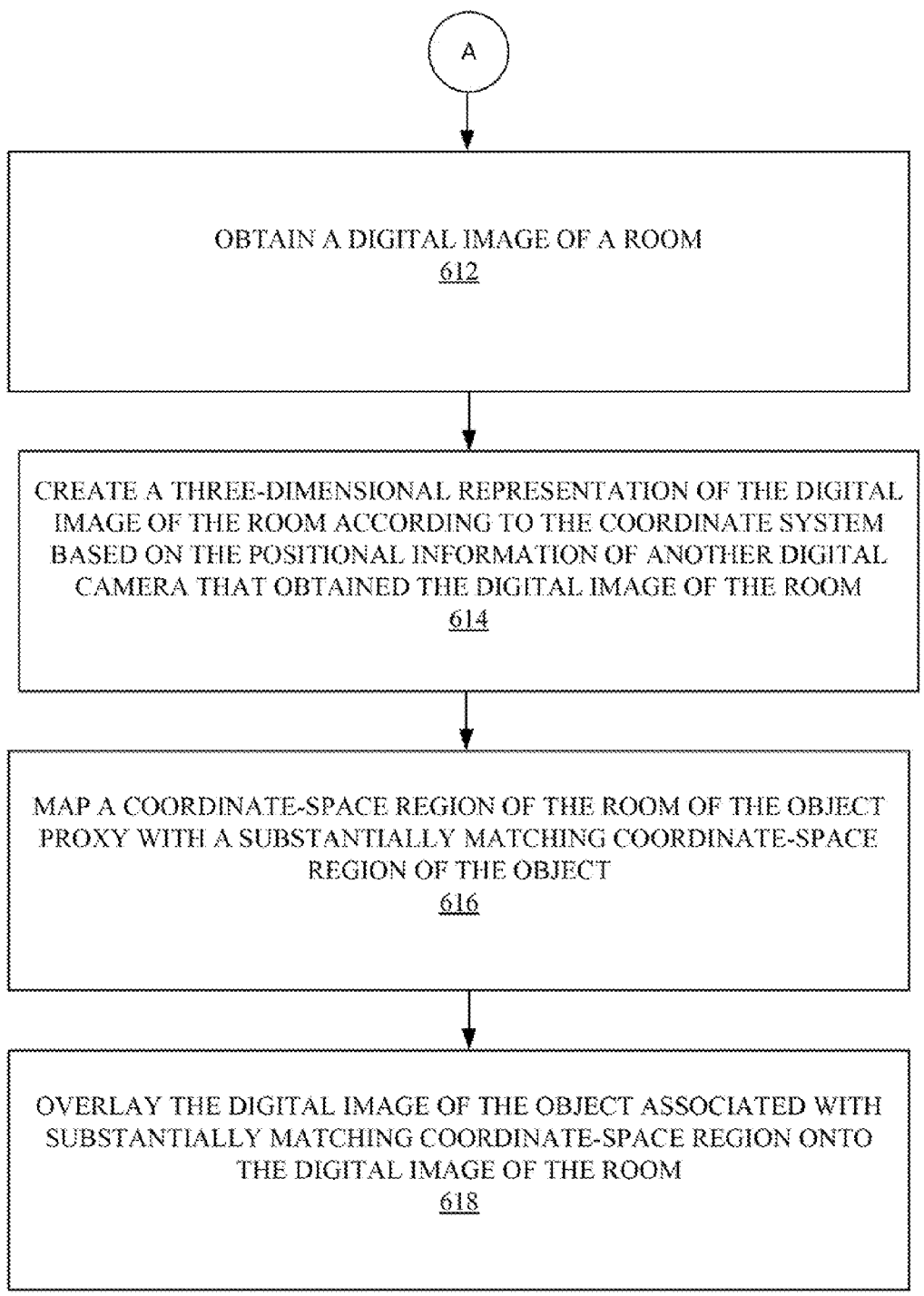

FIGS. 6 A-B illustrate an example discretization process 600, according some embodiments. In step 602 of process 600, a digital image of an object can be obtained. In step 604 a coordinate-space position of a digital camera can be defined in relation to the digital object for the digital image. In step 606, a coordinate-space region around the coordinate-space position can be defined. In step 608, the coordinate-space region can be associated with the digital image based on the coordinate-space position defined for the digital image. In step 610 and step 612, a digital image of a room can be obtained. In step 614, a three-dimensional representation of the digital image of the room can be created according to the coordinate system based on the positional information of another digital camera that obtained the digital image of the room. An object proxy can be located in the three-dimensional representation of the digital image. In step 616, a coordinate-space region of the room of the object proxy can be mapped with a substantially matching coordinate-space region of the object. In step 618, the digital image of the object associated with substantially matching coordinate-space region can be overlaid onto the digital image of the room. Systems 100, 200, 300 and 400 can be utilized to perform processes 500 and/or 600.

Exemplary Use Cases and Additional Exemplary Processes

An example use case is now described according a particular embodiment. The first step can be the identification of the three-dimensional coordinate system represented by a digital camera that has taken a two-dimensional photograph. This can involve identifying the position of the digital camera along the three axes as well as identifying the axis of rotation in each of the three directions. The height of the digital camera from the ground represented the vertical position can be measured. The planar positioning of the objects with respect to the digital camera can be based on the three-dimensional coordinate transformations. Some digital camera properties can be extracted from the EXIF (Exchangeable Image File Format) data of the photograph. The roll, the pitch and the yaw of the digital camera can represent the three rotations of the axes. These can be calculated and/or eliminated by user interaction with the photograph to create a three-dimensional coordinate system.

The second step can be the discretization of the three-dimensional coordinate system that identified in step one. Discretization can include the process of dividing the continuous space into discrete sub-volumes. Any point belonging to any of those sub-volumes is approximated to be at the center of that volume for the purpose of choosing from the n discretized images. This process can be carried out as a first step toward making them suitable for numerical evaluation and implementation. The present embodiment can include the discretization of the three-dimensional space into discrete blocks of space. An analogous example can be the discretization of an analog image as discrete pixels, wherein each pixel represents a single value which approximates the overall content within the space that that particular pixel represents. The higher the 'resolution' of the discretization, the more 'true' may be the representation, for example. Similarly, the three-dimensional space represented by a digital camera view, can be discretized into several small blocks, wherein each block can represent a single value that approximates the overall three-dimensional representation of that block. This discretization can enable a finite number of visual combinations that can be used to create the two-dimensional representation of the objects within the three-dimensional space. Just as increasing the number of pixels of an analog image the accuracy of the digital representation increases, similarly higher the level of discretization of the three dimensional space, higher will be the accuracy of the discretized representation of that space.

The third step can be to generate the rendered set of views of the objects for that discretized space. These rendered views can be two-dimensional images that are pre-generated and then used based on the object position in the three-dimensional space. By pre-generating these images the complexities of the object that can be represented is then represented by two-dimensional pixels rather than three-dimensional geometry—thus allowing for real time representation of complex objects independent of the computing hardware. This allows for the overlay of two-dimensional object images on the top of a two-dimensional photograph that can be visually equivalent to the three-dimensional representation.

As an example of discretized three-dimensional technology application may be used for interactively furnishing photographs of vacant rooms. Online retailers, furniture dealers and the like, may provide pictures, dimensions and other information for furnishings they may offer (e.g., a Milano chair, a Z chair, a Koko bench, a Chandra Rugs Faro, etc.). In addition, local retailers may also provide samples of the real furnishings they may offer. However, in neither case is the buyer able to determine whether the items they want online and/or locally complement each other or the room they may be placed in. Overlaying photographs of objects on the photograph of a room cannot work if the perspectives do not match and create an unrealistic view. Three-dimensional models may be placed using three-dimensional viewers, however, they may provide a 'cartoonish' image and may not aid the viewer.

Items (e.g. digital images and/or digital proxies of items) may be dragged and dropped into a photograph, according to one or more embodiments. One embodiment can include mapping a digital camera's three-dimensional space. A photograph may be a two-dimensional collection of pixels. These pixels may map the three-dimensional space that the digital camera may have captured. According to one or more embodiments, the method and/or system may map this three-dimensional space. According to other embodiments, three-dimensional objects may be added to the mapped space. According to one or more exemplary embodiments, a photograph's three-dimensional space may be integrated with three-dimensional object representations.

Example use cases may include, but may not be limited to: electronic retailing and Software as a Service, social marketplaces, and virtual goods, according to one or more embodiments. Furniture retailers and manufacturers may use the invention for photorealistic virtual galleries, digital assets and/or strategic business intelligence. The invention, according to one or more embodiments, may be implemented as a social media platform for design and décor and may comprise a community of buyers, interior design enthusiasts and professionals. It may also comprise collective intelligence and multi-layered social analytics and may be linked to e-Tailing and physical products, according to one or more exemplary embodiments. This may be extended to, inter alia: multi-platforms, creating virtual galleries and catalogues, may be powered by digital assets, may showcase furniture in virtual showrooms (e.g., a collection of semi-furnished room photographs such that buyers may try the furniture), may showcase furniture in customer photographs, may provide strategic business intelligence (e.g., may help analyze and aggregate customer clicks), may be used in physical showrooms (e.g., at a kiosk), and/or may be used by design consultants who may use mobile devices to visit a client, take a photograph and interactively design, according to one or more exemplary embodiments.

According to one example embodiment, one use case may be used for the property sale and/or rental markets. It may comprise smart rental guides and one or more staging toolsets. It may also have provisioning for rental properties and MLS listings, according to one or more exemplary embodiments. The method and/or system may be implanted and/or may comprise an interior design as a game function. Furnishings may be earned or bought and it may comprise furniture hierarchy and virtual goods pricing models correlated with the real world, according to one or more illustrative examples.

The method and/or system, according to one or more embodiments, may be implemented for virtual goods and/or tablet computers as a design tool. An application may provide a platform for interior design. The target may be furniture customers, interior design enthusiasts and professionals. According to one embodiment, furniture items may link to a retailer's website or may utilize and referral and/or a marketplace model. The method and/or system may also be implemented in the social marketplace, according to one or more embodiments. It may comprise a social media platform for design and décor. It may be catered to a community of consumers, interior design enthusiasts and other professionals. According to one embodiment, it may comprise one or more design "canvas" and/or one or more design "folios." Consumers may upload one or more images of a room that they may plan to furnish and may seek input from a social circle (e.g., professionals, friends, family, etc.).

According to other embodiments, consumers may explore compelling designs with contributions from their social circle and/or other professionals. A collective intelligence model may also be implemented in addition to multi-layered social analytics built on a powerful collective intelligence platform, according to one or more embodiments.

It is noted that in some embodiments, space can be discretized in any way that suits the current user application. For example, when using system 100 and/or process 500 for photographing architectural spaces, the cylindrical coordinate system can be utilized. It is further noted that discretizing the $\rho$ value of coordinate space coordinates $\rho$, $\phi$, z uniformly may not perceptible to the user as the perceived size of an object can decrease faster the closer to the object is to the camera (and slower farther away the object is from the camera). In this way, in one example, the $\rho$ can be discretized in a non-linear manner. The $\phi$ can be discretized in uniform steps. The discretization of z can be decided based on the current application. For example, with the placement of objects interior spaces as home accessories and/or furniture placed at different z coordinates. It further is noted that a rotation dimension can be utilized (e.g. in system 100 and/or process 500). Thus, each object can be rotated a full three-hundred and sixty (360) degrees in each location of a room after it (and the room) have been discretized.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method comprising:
   obtaining a digital image of an object;
   defining, according to a coordinate system, a coordinate-space position of a digital camera in relation to the object in the digital image;
   defining a coordinate-space region around the coordinate-space position;
   associating the coordinate-space region with the digital image based on the coordinate-space position defined for the digital image;
   obtaining a digital image of a room;
   creating a three-dimensional representation of the digital image of the room according to the coordinate system based on positional information of another digital camera that obtained the digital image of the room;
   locating an object proxy in the three-dimensional representation of the digital image of the room;
   mapping a coordinate-space region of the room of the object proxy with a matching coordinate-space region of the object; and
   overlaying the digital image of the object associated with the matching coordinate-space region onto the digital image of the room, wherein the coordinate-space position is defined according to a cylindrical coordinate system, wherein the cylindrical coordinate system is defined by a ρ-value, a φ-value, and a z-axis value, wherein the ρ-value defines a distance from the z-axis value to the object, wherein the φ-value defines an angle between a reference direction on a chosen plane and a line from the object to the digital camera on the chosen plane, and wherein the z-axis value defines a signed distance from the chosen plane to the object.

2. The computer-implemented method of claim 1, wherein the z-axis value comprises a constant value for each of the digital image and wherein the ρ-value, and the φ-value vary between each of the digital images.

3. The computer-implemented method of claim 2, wherein more than one digital image is obtained.

4. The computer-implemented method of claim 1, wherein the object comprises a sofa.

5. The computer-implemented method of claim 4, wherein a z-axis value comprises a range between a minimum of a maximum height of the sofa and a maximum of five-feet.

6. The computer-implemented method of claim 1, wherein the object comprises a vase.

7. The computer-implemented method of claim 1, wherein the z-axis value is set according to a placement height of the vase in a showroom.

8. The computer-implemented method of claim 1, wherein the digital image of the object comprises a digital camera digital image or a computer-rendered digital image.

9. The computer-implemented method of claim 1, wherein the digital camera comprises a physical digital camera or a virtual digital camera inside a virtual three-dimensional space.

10. A computer system comprising: a memory configured to store a set of instructions used to implement discretizing three-dimensional space or objects for two-dimensional representations; and
    one or more processors configured to:
    obtain a digital image of an object;
    define, according to a coordinate system, a coordinate-space position of a digital camera in relation to the object in the digital image;
    define a coordinate-space region around the coordinate-space position;
    associate the coordinate-space region with the digital image based on the coordinate-space position defined for the digital image;
    obtain a digital image of a room;
    create a three-dimensional representation of the digital image of the room according to the coordinate system based on positional information of another digital camera that obtained the digital image of the room;
    locate an object proxy in the three-dimensional representation of the digital image of the room;
    match a closest object proxy from a collection of object proxies created from a discretization process with a set of known three dimensional positions;
    map a coordinate-space region of the room of the object proxy with a matching coordinate-space region of the object; and
    overlay the digital image of the object associated with the matching coordinate-space region onto the digital image of the room, wherein the coordinate-space position is defined according to a cylindrical coordinate system, wherein the cylindrical coordinate system is defined by a ρ-value, a φ-value, and a z-axis value, wherein the ρ-value defines a distance from the z-axis value to the object, wherein the φ-value defines an angle between a reference direction on a chosen plane and a line from the object to the digital camera on the chosen plane, and wherein the z-axis value defines a signed distance from the chosen plane to the object.

11. The computer-implemented system of claim 10, wherein more than one digital image is obtained.

12. The computer-implemented system of claim 10, wherein the object comprises a sofa.

13. The computer-implemented method of claim 12, wherein a z-axis value comprises a range between a minimum of a maximum height of the sofa and a maximum of six-feet.

14. The computer-implemented system of claim 10, wherein the digital camera comprises a physical digital camera.

15. The computer-implemented system of claim 10, wherein the digital camera comprises a virtual digital camera operating inside a virtual three-dimensional space and wherein the digital image comprises a computer-rendered digital image.

16. A method comprising:

receiving n-number digital images of an object;

defining, according to a coordinate system, n-number coordinate-space positions of a view in relation to the n-number digital images;

defining n-number coordinate-space regions around the n-number coordinate-space positions;

associating each of the n-number coordinate-space regions with the n-number digital images based on the n-number coordinate-space positions defined for the digital image;

obtaining a digital image of a space;

generating a three-dimensional representation of the digital image of the space according to the coordinate system based on positional information of a digital camera that obtained the digital image of a room;

locating an object proxy in the three-dimensional representation of the digital image of the space;

determining a coordinate-space region of the room of the object proxy that matches a matching coordinate-space region of the n-number coordinate-space regions; and modifying the digital image of the space to include the digital image of the object associated with the matching coordinate-space region, wherein the coordinate-space position is defined according to a cylindrical coordinate system, wherein the cylindrical coordinate system is defined by a $\rho$-value, a $\phi$-value, and a z-axis value, wherein the $\rho$-value defines a distance from the z-axis value to the object, wherein the $\phi$-value defines an angle between a reference direction on a chosen plane and a line from the object to the digital camera on the chosen plane, and wherein the z-axis value defines a signed distance from the chosen plane to the object.

* * * * *